United States Patent
Andou et al.

[11] Patent Number: 6,137,053
[45] Date of Patent: Oct. 24, 2000

[54] ELECTRIC DOUBLE-LAYER CAPACITOR HOUSING

[75] Inventors: Kazuo Andou; Koji Kotani; Takeshi Taguchi; Hiroto Kobayashi; Toshiyuki Matsuoka, all of Wako, Japan

[73] Assignee: Honda Giken Kogyo Kabushiki Kaisha, Tokyo, Japan

[21] Appl. No.: 09/234,486

[22] Filed: Jan. 21, 1999

[30] Foreign Application Priority Data

Jan. 22, 1998 [JP] Japan .................................. 10-010804
Jun. 19, 1998 [JP] Japan .................................. 10-173029

[51] Int. Cl.[7] .............................. H05K 5/03; H05K 5/06
[52] U.S. Cl. .......................................................... 174/50.56
[58] Field of Search ............................. 174/50.52, 50.56, 174/50.57, 50.63

[56] References Cited

U.S. PATENT DOCUMENTS 3,023,268  2/1962  Preiser et al. ..................... 174/50.56 X
3,248,618  4/1966  Szpak et al. .............................. 317/258
5,861,577  1/1999  Tamura et al. ........................ 174/50.56

*Primary Examiner*—Dean A. Reichard
*Attorney, Agent, or Firm*—Arent Fox Kintner Plotkin & Kahn, PLLC

[57] ABSTRACT

An electric double-layer capacitor housing has a bottomed outer case for accommodating an electric double-layer capacitor therein, a lid closing an open end of the bottomed outer case, the lid having a through hole defined therein, an electrode terminal mounted in the through hole in the lid for electrically connecting the electric double-layer capacitor in the bottomed outer case to an external circuit, and an insulative sealing member interposed between the lid and the electrode terminal and sealing the through hole. The electrode terminal includes a terminal body, a projecting rod extending from the terminal body, an outer sleeve spaced radially outwardly from the projecting rod, a tapered portion spreading radially outwardly and downwardly, and a flange extending radially outwardly from the tapered portion. The insulative sealing member includes a tubular member fitted over the terminal body and the outer sleeve of the electrode terminal, and a skirt extending radially outwardly from a lower end of the tubular member. The lid includes a circumferential surface defining the through hole, a first convex surface contiguous to an upper end of the through hole, a first concave surface extending around the through hole, a second convex surface contiguous to a lower end of the through hole, and a second concave surface extending around the through hole.

6 Claims, 12 Drawing Sheets

ELECTRIC DOUBLE-LAYER CAPACITOR HOUSING

BACKGROUND OF THE INVENTION

1. Field of the Invention

The present invention relates to a housing for accommodating an electric double-layer capacitor therein.

2. Description of the Related Art

Generally, a boundary across which two different phases of a solid and a liquid contact each other is associated with an electric double layer which comprises positive and negative electric charges that confront each other across a very small distance therebetween. When an electric field is applied between a pair of polarized electrodes, each made of a solid, which confront each other across a separator that is impregnated with an electrolytic solution, the assembly can be used as an electric double-layer capacitor.

FIG. 12 of the accompanying drawings shows a known electric double-layer capacitor housing 61 comprising a bottomed outer case 64 is in the form of a hollow quadrangular prism which accommodates an electric double-layer capacitor 62 composed of a plurality of polarized electrodes having current collectors and stacked together with a separator impregnated with an electrolytic solution and interposed between the polarized electrodes. The electric double-layer capacitor 62 is clamped by a protective strap 63 serving as an insulating member. The electric double-layer capacitor housing 61 also has a lid 65 closing an open end of the bottomed outer case 64, and electrode terminals 67 mounted on the lid 65 and connected respectively to current collecting leads 66a, 66b extending from the current collectors and grouped into respective polarities. To prevent the electrolytic solution impregnated in the separator from leaking out of the bottomed outer case 64, as shown in FIG. 13 of the accompanying drawings, each of the electrode terminals 67 is inserted in a through hole 68 defined in the lid 65, and an insulative sealing member 69 made of an elastomeric material such as fluoroplastics is interposed between the electrode terminal 67 and an inner circumferential surface of the through hole 68. The electrode terminal 67 is crimped over the lid 65 fully around the inner circumferential surface of the through hole 68.

Each of the electrode terminals 67 has an internally threaded surface 70 for electric connection to an external circuit and a tubular member 71 extending upwardly from the internally threaded surface 70. The tubular member 71 is deformed radially outwardly as indicated by the arrows into a bent flange 72, which forces an upper portion of the insulative sealing member 69 to extend horizontally along the lid 65. The insulative sealing member 69 is held against the inner circumferential surface of the through hole 68 and upper and lower surfaces of the lid 65 so as to be uniform in thickness. The upper portion of the insulative sealing member 69 is plastically deformed flatwise as it is sandwiched between the bent flange 72 and the outer surface of the lid 65.

However, the above conventional electric double-layer capacitor housing 61 is disadvantageous in that the ability of the insulative sealing member 69 to seal the interior of the electric double-layer capacitor housing 61 deteriorates with time.

SUMMARY OF THE INVENTION

It is an object of the present invention to provide a housing for accommodating an electric double-layer capacitor, which housing has a reliable interior sealing capability.

The inventors of the present invention have analyzed the conventional electric double-layer capacitor housing 61 shown in FIGS. 12 and 13 to ascertain reasons for the time-dependent deterioration of the ability of the insulative sealing member 69 to seal the interior of the electric double-layer capacitor housing 61. When the insulative sealing member 69 is secured to the lid 65 by the electrode terminal 67, it is held against the inner circumferential surface of the through hole 68 and upper and lower surfaces of the lid 65 so as to be uniform in thickness. The upper portion of the insulative sealing member 69 is plastically deformed flatwise by being sandwiched between the bent flange 72 and the outer surface of the lid 65. It has been found that the plastic deformation of the sandwiched upper portion of the insulative sealing member 69 affects another portion of the insulative sealing member 69. Since the plastic deformation of the sandwiched upper portion of the insulative sealing member 69 affects another portion of the insulative sealing member 69, particularly the portion of the insulative sealing member 69 which is present between the electrode terminal 67 and the inner circumferential surface of the through hole 68, the elasticity of the insulative sealing member 69 decreases with time, resulting in a reduction in its sealing capability for the interior of the housing 61.

To achieve the above object, there is provided in accordance with the present invention an electric double-layer capacitor housing comprising a bottomed outer case for accommodating an electric double-layer capacitor therein, a lid closing an open end of the bottomed outer case, the lid having a through hole defined therein, an electrode terminal mounted in the through hole in the lid for electrically connecting the electric double-layer capacitor in the bottomed outer case to an external circuit, and an insulative sealing member interposed between the lid and the electrode terminal and sealing the through hole, the electrode terminal comprising a terminal body, a projecting rod extending upwardly from the terminal body coaxially therewith, an outer sleeve integral with the terminal body and spaced radially outwardly from the projecting rod, a tapered portion extending downwardly from the terminal body and spreading radially outwardly and downwardly, and a flange extending radially outwardly from the tapered portion and having an upward ridge on an edge thereof, the insulative sealing member comprising a tubular member fitted over the terminal body and the outer sleeve of the electrode terminal, and a skirt extending radially outwardly from a lower end of the tubular member, the lid comprising a circumferential surface defining a through hole through which the terminal body and the outer sleeve of the electrode terminal are inserted, a first convex surface contiguous to an upper end of the through hole and disposed on an upper surface of the lid, a first concave surface extending around the through hole, contiguous to the first convex surface, and disposed on the upper surface of the lid, a second convex surface contiguous to a lower end of the through hole and disposed on a lower surface of the lid, and a second concave surface extending around the through hole, contiguous to the second convex surface, disposed on the lower surface of the lid, and engaging the upward ridge of the flange of the electrode terminal, the arrangement being such that the electrode terminal, with the tubular member of the insulative sealing member being fitted over the terminal body and the outer sleeve, is inserted into the through hole in the lid, and the outer sleeve is crimped radially outwardly into a bent flange, for thereby clamping a tip end of the tubular member between the bent flange, and the first convex surface and the first concave surface of the lid, and clamping the skirt between the flange and the tapered portion, and the second convex surface and the second concave surface of the lid.

The electrode terminal and the lid are assembled together by inserting the electrode terminal, with the tubular member of the insulative sealing member being fitted over the terminal body and the outer sleeve, into the through hole in the lid. At this time, the skirt of the insulative sealing member is disposed between the flange of the electrode terminal and the lower surface of the lid. Then, the outer sleeve is crimped radially outwardly into the bent flange, whereupon the tip end of the tubular member is clamped between the bent flange, and the first convex surface and the first concave surface of the lid. When the outer sleeve is crimped radially outwardly into the bent flange, the skirt of the insulative sealing member which has been disposed between the flange of the electrode terminal and the lower surface of the lid is clamped between the flange and the tapered portion, and the second convex surface and the second concave surface of the lid.

The first convex surface and the first concave surface are disposed on the upper surface of the lid. Therefore, the outer sleeve is guided and deformed by the first convex surface and the first concave surface, forming a smaller portion of the gap between the bent flange and the lid, between the bent flange and the first convex surface. Another portion of the gap between the bent flange and the lid is also formed between a junction between the first convex surface and the first concave surface, and the bent flange. A larger portion of the gap between the bent flange and the lid is formed between the smaller portions of the gap. Even when the insulative sealing member clamped in the gap between the bent flange and the lid is plastically deformed, the plastic deformation is prevented from affecting another portion of the insulative sealing member by the smaller portions of the gap between the bent flange and the lid.

The second convex surface and the second concave surface are disposed on the lower surface of the lid. Therefore, a smaller portion of the gap between the electrode terminal and the lid is formed between the tapered portion and the second convex surface. Another portion of the gap between the electrode terminal and the lid is formed between a junction between the second convex surface and the second concave surface, and the upward ridge on the edge of the flange. A large portion of the gap between the electrode terminal and the lid is formed between the smaller portions of the gap. Even when the insulative sealing member clamped in the gap between the electrode terminal and the lid is plastically deformed, the plastic deformation is prevented from affecting another portion of the insulative sealing member by the smaller portions of the gap between the electrode terminal and the lid.

Because the plastic deformation is prevented from affecting the portion of the insulative sealing member which is interposed between the electrode terminal and the inner circumferential surface of the through hole in the lid, allowing the above interposed portion of the insulative sealing member to remain elastic for a long period of time, thereby keeping the interior of the outer case reliably sealed.

The smaller portions of the gap are formed between the bent flange or the flange and the lid. Therefore, the elastomeric material of the insulative sealing member moves Theologically from the smaller portions of the gap into the larger portion of the gap and the region disposed between the electrode terminal and the inner circumferential surface of the through hole in the lid. As a result, the elastomeric material in the larger portion of the gap and the region disposed between the electrode terminal and the inner circumferential surface of the through hole in the lid increases in quantity, providing elasticity for a long period of time.

The projecting rod and the outer sleeve are spaced apart from each other by a gap having a bottom which is positioned downwardly of the upper end of the through hole when the bent flange is formed. With this structure, when the bent flange is formed, the smaller portion of the gap can easily be formed between the bent flange and the first convex surface of the lid, and the larger portion of the gap can easily be formed outwardly adjacent to the smaller portion of the gap.

The tapered portion has an upper end positioned upwardly of the lower end of the through hole when the bent flange is formed. With this structure, when the bent flange is formed, the smaller portion of the gap can easily be formed between the tapered portion and the second convex surface of the lid, and the larger portion of the gap can easily be formed outwardly adjacent to the smaller portion of the gap.

The tubular member is thicker than the skirt. When the outer sleeve is crimped radially outwardly into the bent flange, the upper end of the tubular member is reduced in thickness by being compressed by the bent flange. Since the tubular member is thicker than the skirt, the thickness of the insulative sealing member clamped between the bent flange and the upper surface of the lid becomes equal to the thickness of the skirt clamped between the flange and the lower surface of the lid. Consequently, the insulative sealing member interposed between the electrode terminal and the inner circumferential surface of the through hole in the lid is relatively thick, providing elasticity maintained for a long period of time.

The electrode terminal has a connector mounted on the projecting rod outside of the bottomed outer case for electrical connection to the external circuit, the connector comprising a tubular member fitted over and fixed to the projecting rod and a shape keeper connected to an end of the tubular member closer to the bottomed outer case and positioned on the bent flange for keeping the shape of the bent flange. Therefore, the electric double-layer capacitor can easily be electrically connected to the external circuit by the connector. The connector may be plated or otherwise subjected to a surface treatment, or threaded on its outer circumferential surface for electric connection to the external circuit.

The bent flange is subject to forces tending to recover the original shape of the outer sleeve. However, since the tubular member is fixed to the projecting rod of the electrode terminal, the shape keeper can keep the shape of the bent flange against the recovering forces.

Before the outer sleeve is crimped into the bent flange, the electrode terminal and the lid are assembled together with the tubular member of the insulative sealing member being interposed between the outer sleeve and the inner circumferential surface of the through hole in the lid. However, inasmuch as the electrode terminal, the insulative sealing member, and the lid remain assembled together only under frictional forces acting therebetween, the electrode terminal may possible be dislodged when the electrode terminal, the insulative sealing member, and the lid are moved to a next process.

To avoid the above problem, the insulative sealing member has an annular lip projecting radially inwardly and extending along an inner circumferential surface of the tubular member fitted over the electrode terminal.

When the electrode terminal and the lid are assembled together with the tubular member of the insulative sealing member being interposed between the outer sleeve and the inner circumferential surface of the through hole in the lid, the annular lip on the inner circumferential surface of the tubular member is held against the electrode terminal, spreading the tubular member radially outwardly. Since the insulative sealing member is elastomeric, the outer circumferential surface of the tubular member is pressed against the inner circumferential surface of the through hole. When the tubular member is spread radially outwardly, it is subject to restoring forces which press the annular lip against the electrode terminal.

Due to the elastic forces of the insulative sealing member which acts between the electrode terminal and the inner circumferential surface of the through hole, the electrode terminal and the lid remain assembled together with the insulative sealing member interposed there-between. Accordingly, the electrode terminal is securely prevented from being dislodged out of place, but can easily be installed on the lid.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
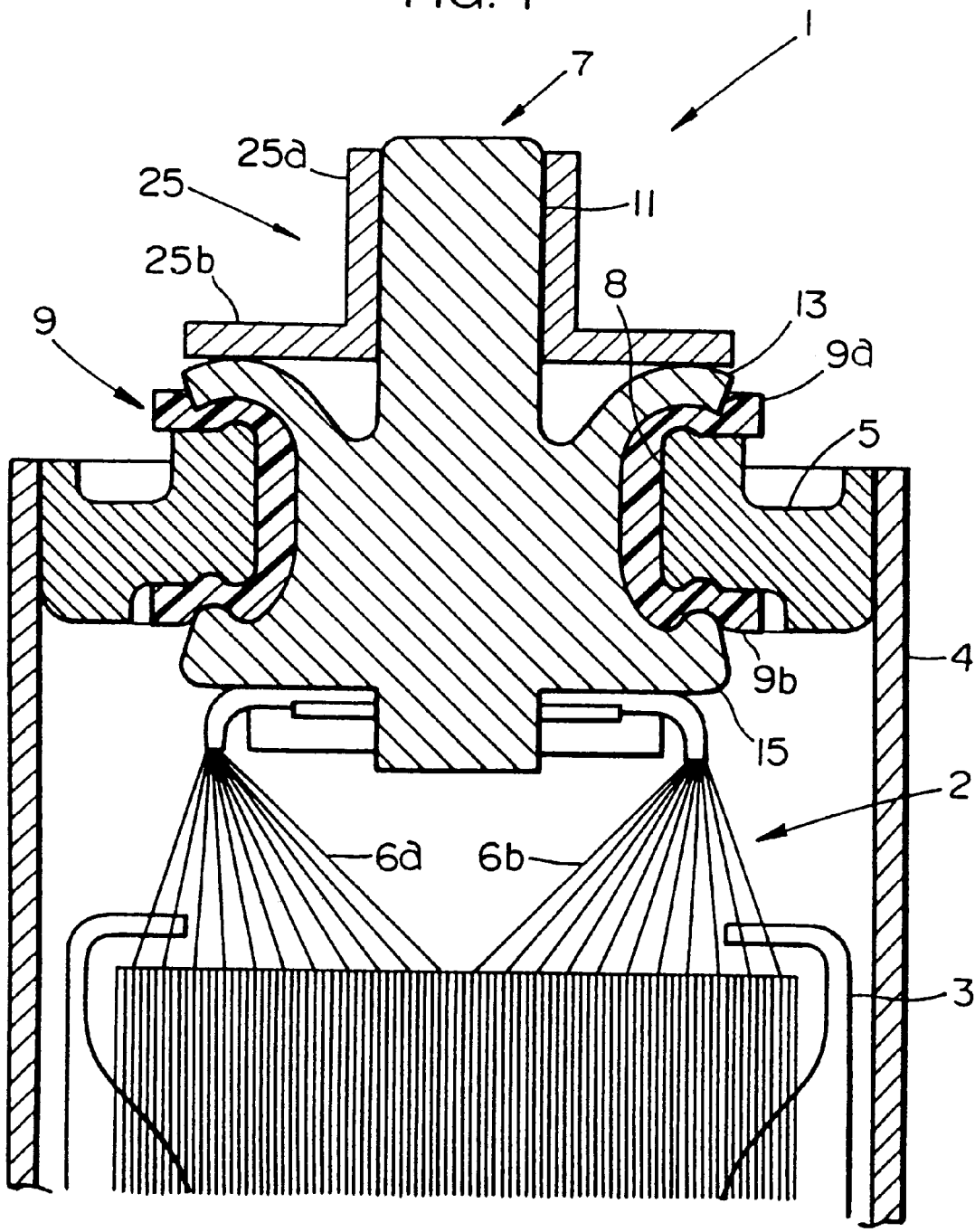
FIG. 1 is a fragmentary cross-sectional view of an electric double-layer capacitor housing according to the present invention.

As shown in FIG. 1, an electric double-layer capacitor housing 1 comprises a bottomed outer case 4 in the form of a hollow quadrangular prism which accommodates an electric double-layer capacitor 2 composed of a plurality of electrode elements having current collectors supporting polarized electrodes on surfaces thereof and stacked together with a separator impregnated with an electrolytic solution and interposed between the current collectors. The electric double-layer capacitor 2 is clamped by a protective strap 3 serving as an insulating member. The electric double-layer capacitor housing 1 also has a lid 5 of aluminum closing an open end of the bottomed outer case 4, and electrode terminals 7 mounted on the lid 5 and connected respectively to current collecting leads 6a, 6b extending from the current collectors and grouped into respective polarities. The electrode terminals 7 serve to connect the electric double-layer capacitor 2 to an external circuit. Each of the electrode terminals 7 is substantially cylindrical in shape, and is inserted in a through hole 8 defined in the lid 5. To prevent the electrolytic solution impregnated in the separator from leaking out of the bottomed outer case 4, each of the electrode terminals 7 is inserted in a through hole 8 defined in the lid 5, and an insulative sealing member 9 is interposed between the electrode terminal 7 and an inner circumferential surface of the through hole 8. The electrode terminal 7 is crimped over the lid 5 fully around the inner circumferential surface of the through hole 8.

Figure 2:
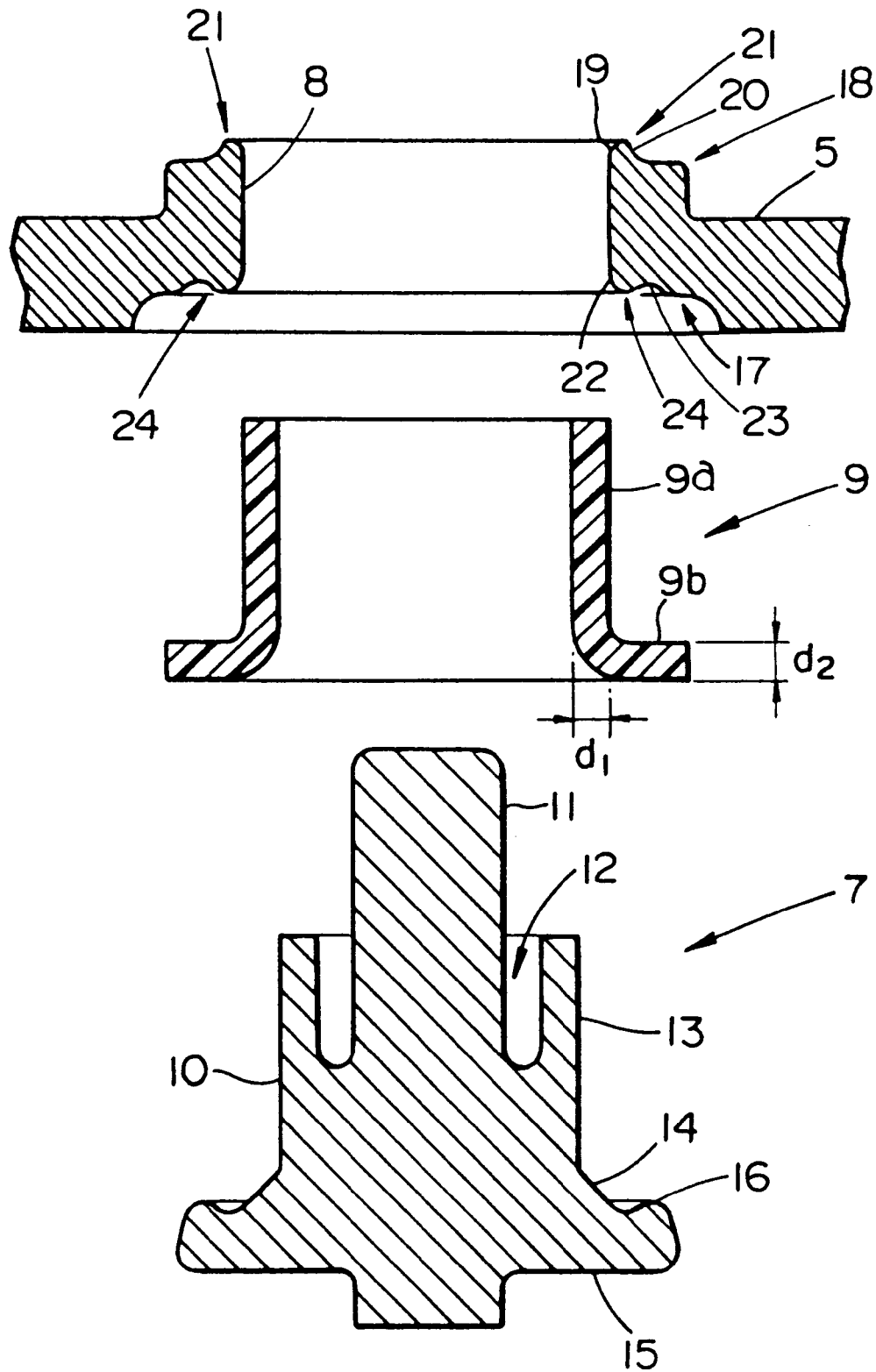
FIG. 2 is an enlarged exploded cross-sectional view of parts of the electric double-layer capacitor housing shown in FIG. 1.

As shown in FIG. 2, each of the electrode terminals 7 comprises a large-diameter terminal body 10 positioned centrally in the cylindrical shape and a projecting rod 11 extending upwardly from the terminal body 10 coaxially therewith. The projecting rod 11 is smaller in diameter than the terminal body 10. The electrode terminal 7 also includes an outer sleeve 13 spaced radially outwardly from the projecting rod 11. The outer sleeve 13 has an outside diameter which is the same as the outside diameter of the terminal body 10, so that the projecting rod 11 appears as if it is a portion extending integrally upwardly from the terminal body 10.

The electrode terminal 7 also has a tapered portion 14 extending downwardly and radially outwardly from a lower end of the terminal body 10, and a flange 15 extending radially outwardly from a lower end of the tapered portion 14. The flange 15 has an upwardly projecting annular ridge 16 on its outermost edge.

The insulative sealing member 9 comprises a tubular member 9a fitted over the terminal body 10 and the outer sleeve 13 of the electrode terminal 7, and a flange skirt 9b extending radially outwardly from a lower end of the tubular member 9a. The tubular member 9a has a wall thickness $d_1$, which is greater than the wall thickness $d_2$ of the flange skirt 9b ($d_1 > d_2$). The insulative sealing member 9 is made of an elastomeric material such as fluoroplastics, rubber, or the like. One example of such fluoroplastics is Teflon TFE (tradename) manufactured by Mitsui-Du Pont Fluorochemical Co., LTD.

The lid 5, partly shown in FIG. 2, has a recess 17 defined in a lower surface thereof for accommodating therein the flange skirt 9b of the insulative sealing member 9, and an electrode terminal mount 18 positioned above and projecting upwardly from the upper surface of the lid 5. The through hole 8 is defined centrally in the electrode terminal mount 18. The through hole 8 has an upper end opening in an outwardly spreading shape at the upper surface of the lid 5. The electrode terminal mount 18 has an upper convex surface 19 contiguous to the upper opening of the through hole 8, and an upper concave surface 20 contiguous to the upper convex surface 19 and extending around the through hole 8, with an angular edge 21 interposed between the upper convex surface 19 and the upper concave surface 20.

The through hole 8 has a lower end opening in an outwardly spreading shape into the recess 17 at the lower surface of the lid 5. The lid 5 has a lower convex surface 22 contiguous to the lower opening of the through hole 8, and a lower concave surface 23 contiguous to the lower convex surface 22 and extending around the through hole 8, with an angular edge 24 interposed between the lower convex surface 22 and the lower concave surface 23. The lower concave surface 23 is shaped for engagement with the upwardly projecting annular ridge 16 of the flange 15 of the electrode terminal 7.

The electrode terminal 7 is inserted into the tubular member 9*a* from the lower end of the insulative sealing member 9. With the tubular member 9*a* fitted over the terminal body 10 and the outer sleeve 13, the electrode terminal 7 and the insulative sealing member 9 are introduced into the through hole 8 in the lid 5. Alternatively, the insulative sealing member 9 may have already been placed in the through hole 8 in the lid 5 when the electrode terminal 7 is inserted into tubular member 9*a*. Then, as shown in FIG. 1, the outer sleeve 13 is deformed radially outwardly into a bent flange 13*a*, and the tip end of the tubular member 9*a* of the insulative sealing member 9 is sandwiched between the bent flange 13*a* and the upper surface of the lid 5. The flange skirt 9*b* of the insulative sealing member 9 is sandwiched between the tapered portion 14 and the flange 15 of the electrode terminal 7 and the lower surface of the lid 5. In this manner, the insulative sealing member 9 is crimped in place between the electrode terminal 7 and the lid 5.

A connector ring 25 for electrically connecting the electrode terminal 7 to an external circuit is mounted on the projecting rod 11 of the electrode terminal 7. The connector ring 25 comprises a tubular member 25*a* fitted over and fixed to the projecting rod 11 and a flange-like shape keeper 25*b* connected to a lower end of the tubular member 25*a*. The shape keeper 25*b* is positioned on the bent flange 13*a* and cover the bent flange 13*a* in its entirety for keeping the shape of the bent flange 13*a*. The tubular member 25*a* is secured to the projecting rod 11 by a beam welding process, and has an outer circumferential surface plated or threaded for electric connection to an external circuit. The shape keeper 25*b* may have its outer circumferential portion modified in shape to match the shape of the bent flange 13*a*.

The relationship between the electrode terminal 7 with the bent flange 13*a*, the insulative sealing member 9, and the lid 5 will be described in more detail below with reference to FIG. 3.

When the bent flange 13*a* is formed, the tubular member 9*a* of the insulative sealing member 9 has its tip end clamped between the bent flange 13*a* and the upper convex surface 19 and the upper concave surface 20 on the upper surface of the lid 5. A gap 12 created between the projecting rod 11 and the bent flange 13*a* has a bottom 12*a* positioned below the upper end of the through hole 8 which is represented by a line interconnecting the angular edge 21 and a diametrically opposite angular edge 21 (not shown) of the electrode terminal mount 18. As a result, a smaller portion $a_1$ of the gap between the bent flange 13*a* and the lid 5 is formed between a vertex of the upper convex surface 19 in the through hole 8 and the bent flange 13*a* confronting the vertex, and another smaller portion $a_2$ of the gap between the bent flange 13*a* and the lid 5 is formed between the angular edge 21 and the bent flange 13*a* confronting the angular edge 21. A larger portion $b_1$ ($b_1 > a_1$, $b_1 > a_2$) of the gap between the bent flange 13*a* and the lid 5 is formed between the smaller portions $a_1$, $a_2$ of the gap.

On the lower surface of the lid 5, the flange skirt 9*b* of the insulative sealing member 9 is clamped between the tapered portion 14 and the flange 15 of the electrode terminal 7, and the lower convex surface 22 and the lower concave surface 23. The tapered portion 14 has an upper end 14*a* positioned above the lower end of the through hole 8 which is represented by a line interconnecting the angular edge 24 and a diametrically opposite angular edge 24 (not shown). As a result, a smaller portion $a_3$ of the gap between the electrode terminal 7 and the lid 5 is formed between a vertex of the lower convex surface 22 in the through hole 8 and the tapered portion 14 confronting the vertex, and another smaller portion $a_4$ of the gap between the electrode terminal 7 and the lid 5 is formed between the angular edge 24 and the annular ridge 16 confronting the lower convex surface 23. A larger portion $b_2$ ($b_2 > a_3$, $b_2 > a_4$) of the gap between the electrode terminal 7 and the lid 5 is formed between the smaller portions $a_3$, $a_4$ of the gap.

A process of manufacturing the electric double-layer capacitor housing 1 according to the present invention will be described below with reference to FIGS. 4 through 8.

Figure 4:
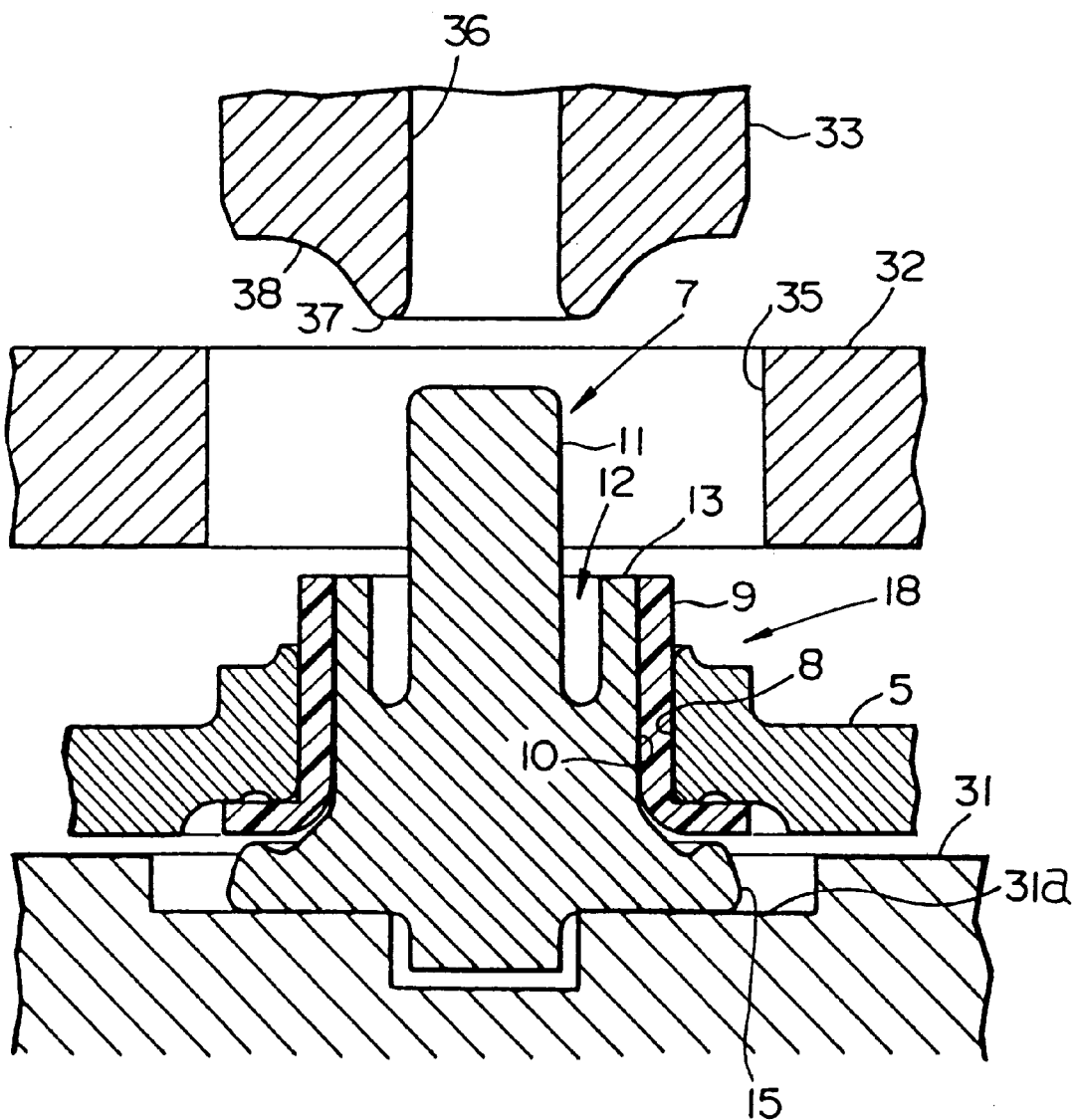

First, the electrode terminal 7 and the lid 5 shown in FIG. 2 are assembled together with the insulative sealing member 9, as shown in FIG. 4. Specifically, the tubular member 9*a* of the insulative sealing member 9 may be fitted over the electrode terminal 7, and the electrode terminal 7 with the tubular member 9*a* fitted thereover may be inserted into the through hole 8 in the lid 5. Alternatively, the tubular member 9*a* of the insulative sealing member 9 may be inserted into the through hole 8, and then the electrode terminal 7 may be inserted into the tubular member 9*a*. When the electrode terminal 7 and the lid 5 are assembled together with the insulative sealing member 9, the flange skirt 9*b* of the insulative sealing member 9 is placed in the recess 17 in the lower surface of the lid 5, and positioned between the bottom of the recess 17 and the flange 15 of the electrode terminal 7.

Then, the electrode terminal 7 and the lid 5 which have been assembled together with the insulative sealing member 9 are placed on a table 31. The table 31 has a cavity 31*a* which receives a lower portion of the electrode terminal 7. Above the table 31, there are disposed a presser 32 for pressing the lid 5 with the electrode terminal 7 installed thereon, a first crimping member 33 for deforming the outer sleeve 13 of the electrode terminal 7 radially outwardly of the through hole 8, and a second crimping member 34 (see FIG. 7) for replacing the first crimping member 33.

The presser 32 has a through hole 35 defined therein for accommodating the electrode terminal mount 18 of the lid 5 therein, and is coaxial with the projecting rod 11 of the electrode terminal 7. The first crimping member 33 has a hole 36 defined therein for accommodating the projecting rod 11 therein and positioned coaxially with the projecting rod 11. The first crimping member 33 also has a convex insertion end 37 around the lower end of the hole 36 for insertion into the gap 12 between the projecting rod 11 and the outer sleeve 13, and a first concave pressing surface 38 extending around the convex insertion end 37 for crimping the outer sleeve 13 radially outwardly.

Figure 5:
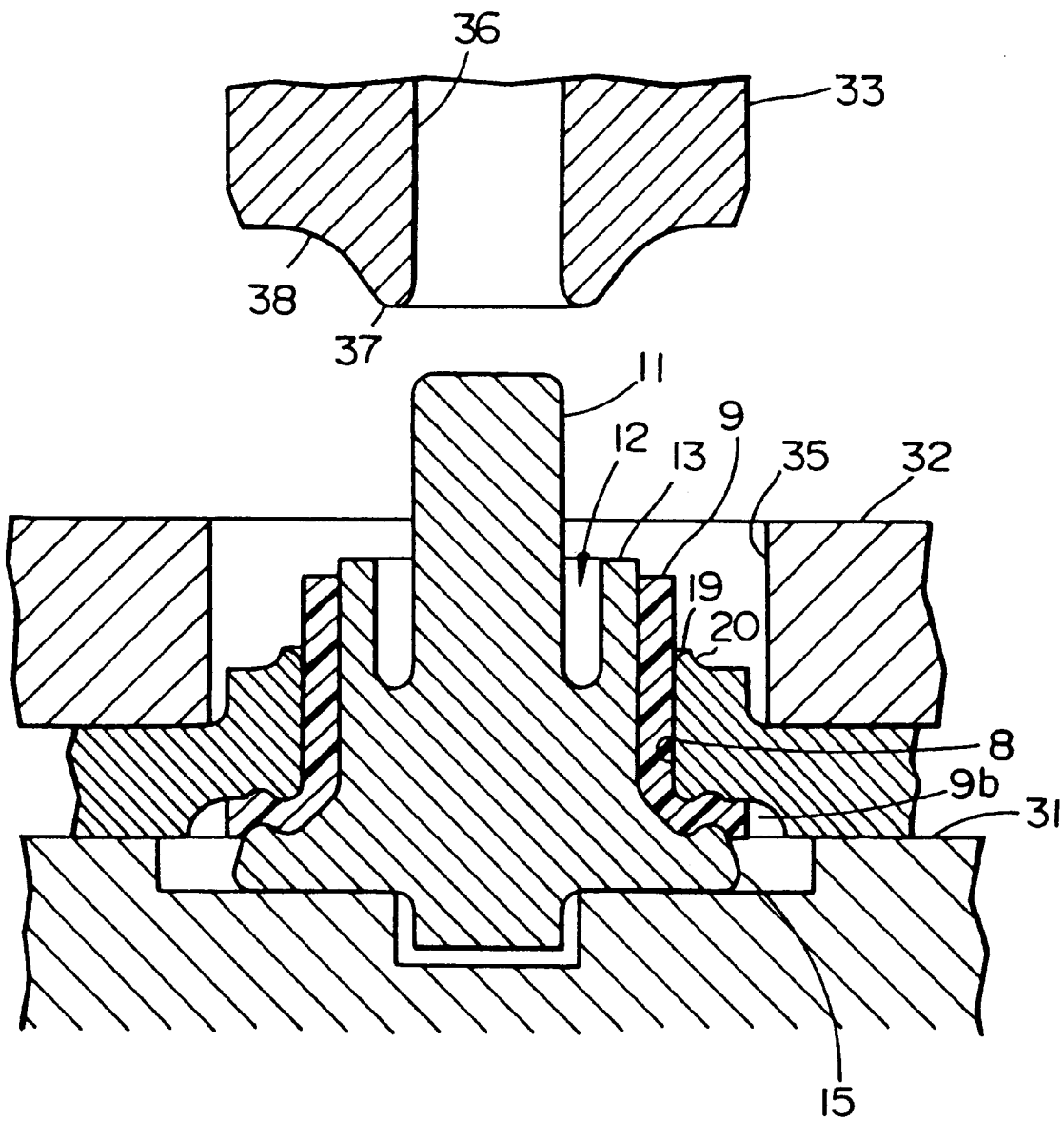

Then, as shown in FIG. 5, the presser 32 is lowered toward the table 31 to press the lid 5 toward the table 31 around the electrode terminal mount 18. As a consequence, the lid 5 is pressed into contact with the table 31, and the flange skirt 9*b* of the electrode terminal 9 is clamped between the tapered portion 14 and the flange 15 of the electrode terminal 7, and the lower convex surface 22 and the lower concave surface 23 of the lid 5.

Figure 6:
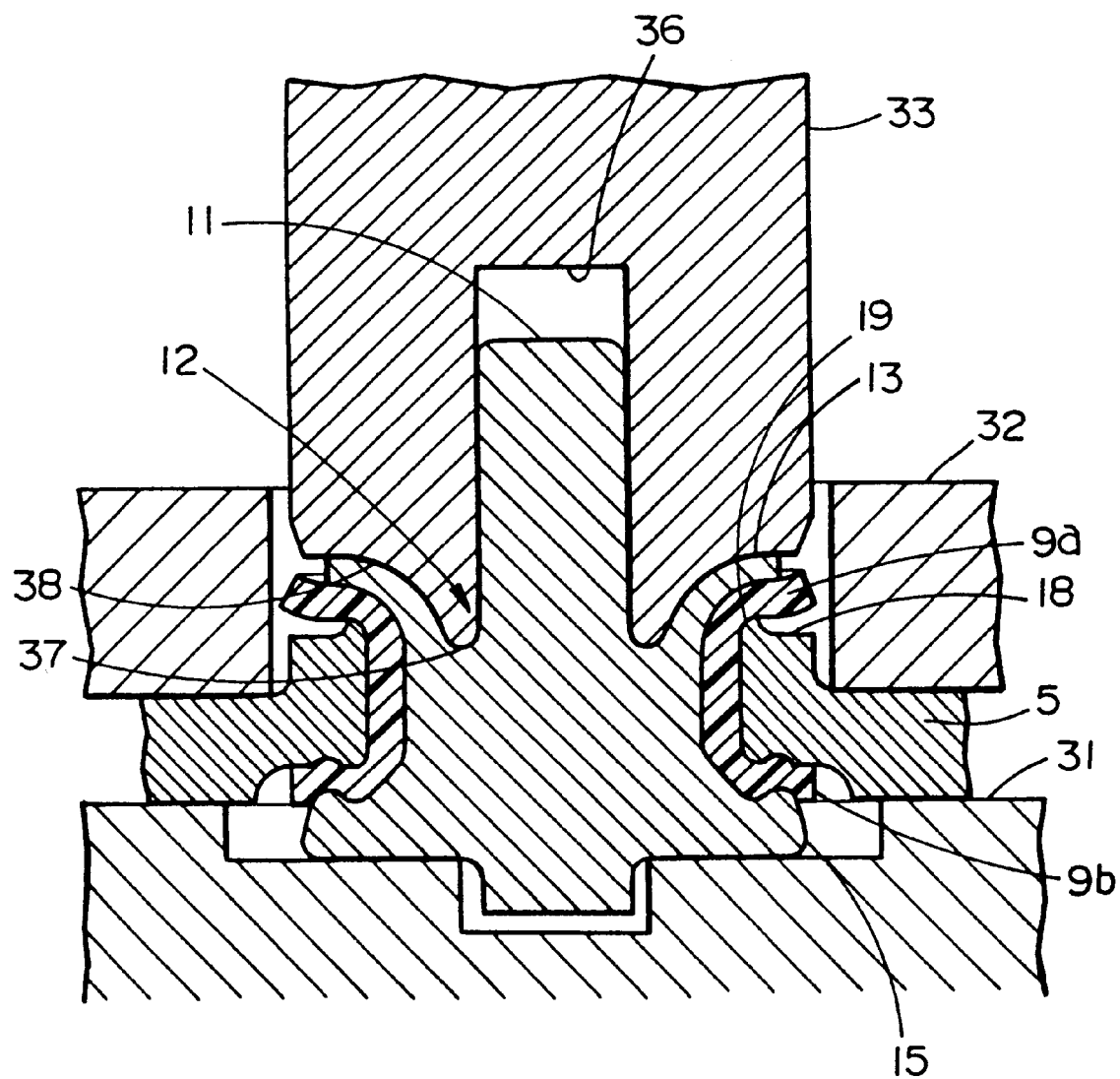

Then, as shown in FIG. 6, the first crimping member 33 is lowered toward the table 31 to insert the insertion end 37 into the gap 12 between the projecting rod 11 and the outer sleeve 13. The upper ends of the outer sleeve 13 and the tubular member 9*a* are now pressed radially outwardly of the through hole 8 by the first pressing surface 38. As the upper ends of the outer sleeve 13 and the tubular member 9*a* are pressed radially outwardly by the first pressing surface 38, the outer sleeve 13 and the tubular member 9a are guided and deformed by the upper convex surface 19 insofar as the upper end of the tubular member 9a is kept out of contact with the electrode terminal mount 18.

Figure 7:
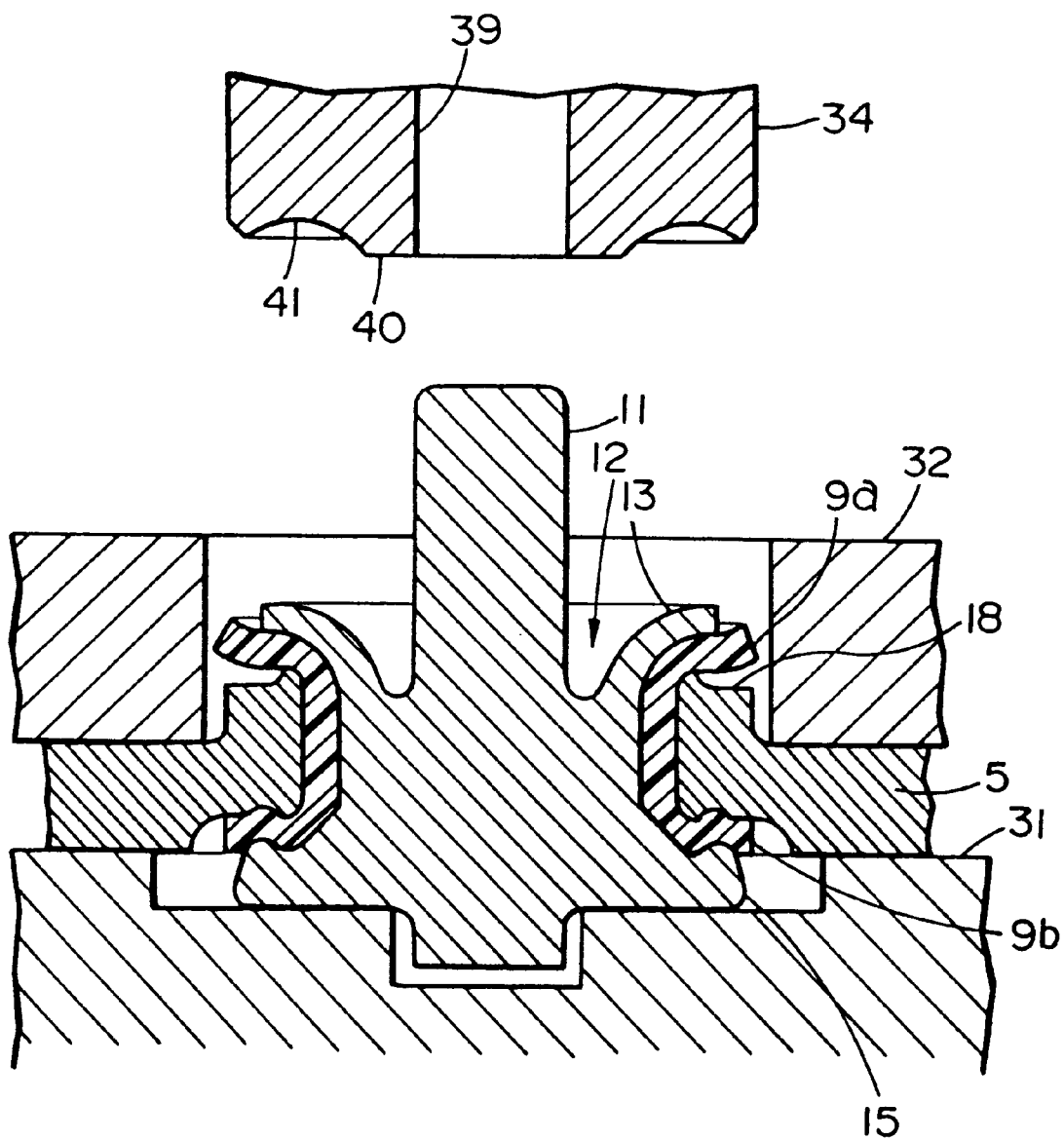

Thereafter, the first crimping member 33 is lifted upwardly of the tale 31, and replaced with the second crimping member 34, as shown in FIG. 7. The second crimping member 34 has a hole 39 defined therein for accommodating the projecting rod 11 therein, and the hole 39 is positioned coaxially with the projecting rod 11 when the second crimping member 34 has replaced the first crimping member 33. The second crimping member 34 also has a flat surface 40 around the lower end of the hole 39 for insertion into the gap 12 between the projecting rod 11 and the outer sleeve 13 which has been deformed as described above, and a second concave pressing surface 41 extending around the flat surface 40 for crimping the deformed outer sleeve 13 further radially outwardly to secure the upper edge of the tubular member 9a of the insulative sealing member 9 against the electrode terminal mount 18 of the lid 5.

Figure 8:
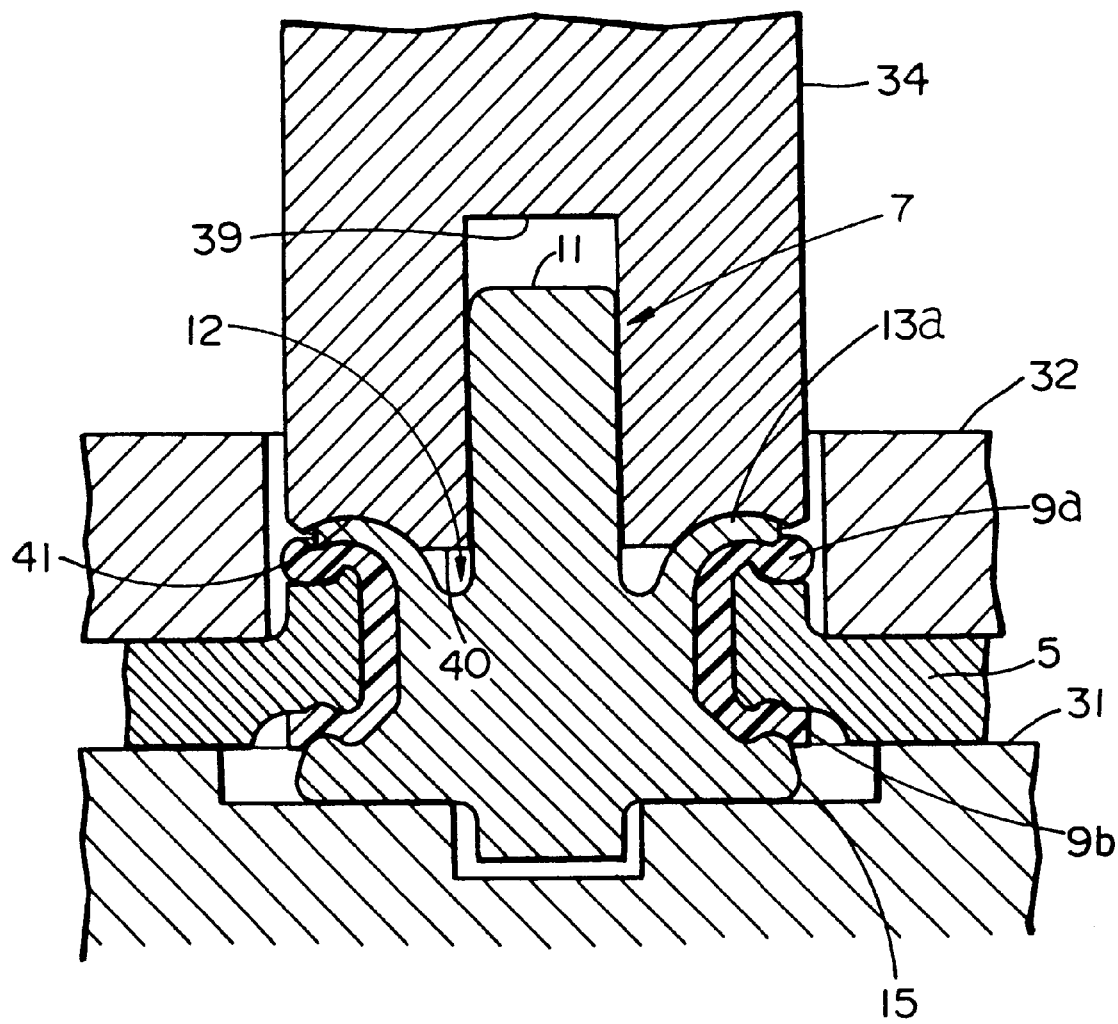

As shown in FIG. 8, the second crimping member 34 is lowered toward the table 31 to insert the flat surface 40 into the gap 12 shown in FIG. 7 and also to cause the second pressing surface 41 to press the upper ends of the outer sleeve 13 and the tubular member 9a. As a result, the upper sleeve 13 is deformed into a bent flange 13a by which the upper end of the tubular member 9a is secured against the electrode terminal mount 18.

Figure 3:
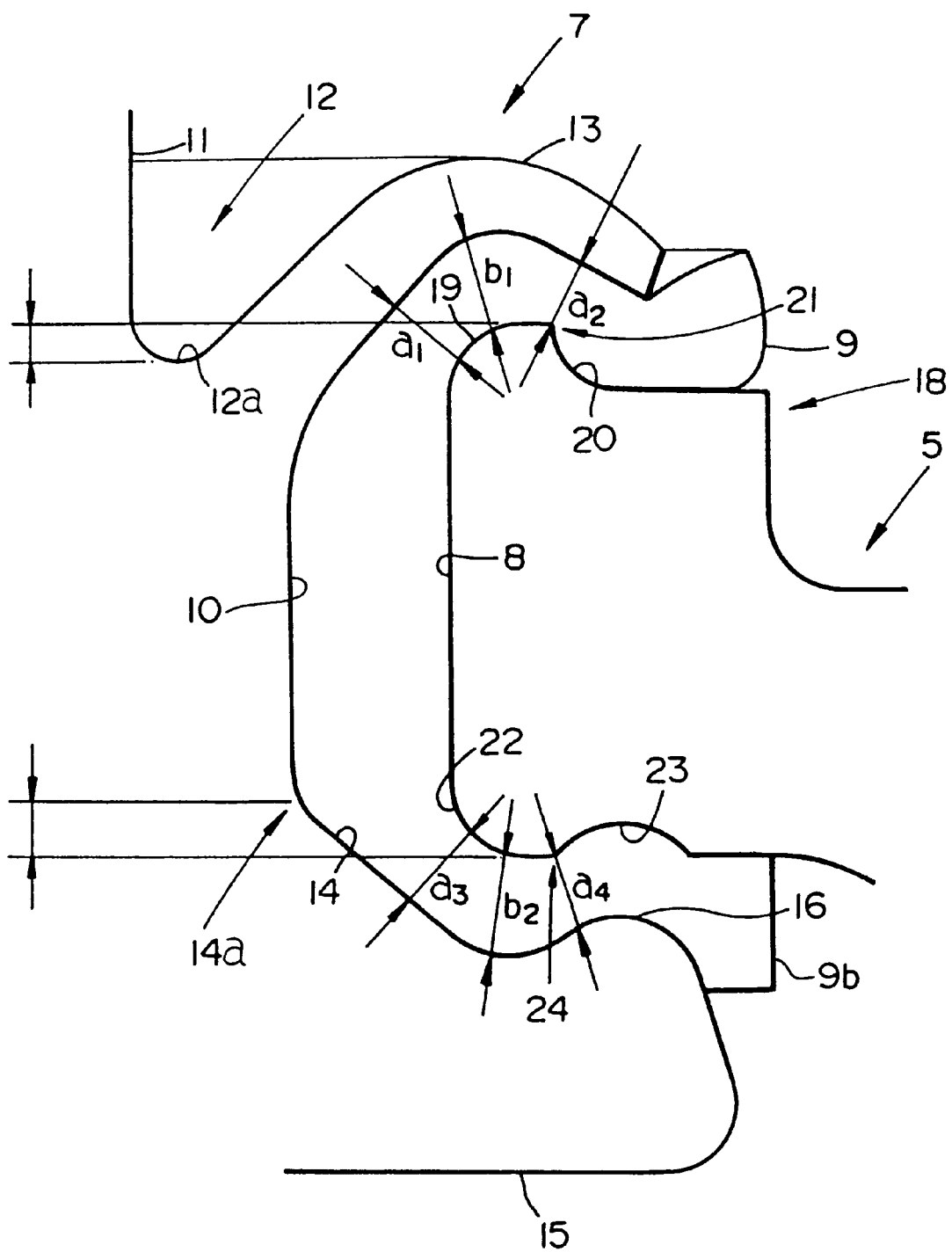
FIGS. 3 through 8 are enlarged fragmentary cross-sectional views illustrative of a process of manufacturing the electric double-layer capacitor housing shown in FIG. 1.

As a result, the electrode terminal 7 shown in FIG. 3 is manufactured.

When the electrode terminal 7 and the lid 5 are assembled together with the tubular member 9a interposed between the terminal body 10 and the outer sleeve 13, and the inner circumferential surface of the through hole 8, the tubular member 9a and the terminal body 10 and the outer sleeve 13, and the tubular member 9a and the inner circumferential surface of the through hole 8 remain assembled only under frictional forces acting there-between. In order to keep these parts securely assembled together, an insulative sealing member 51 shown in FIG. 9 may be employed in place of the insulative sealing member 9 shown in FIG. 2.

Figure 9:
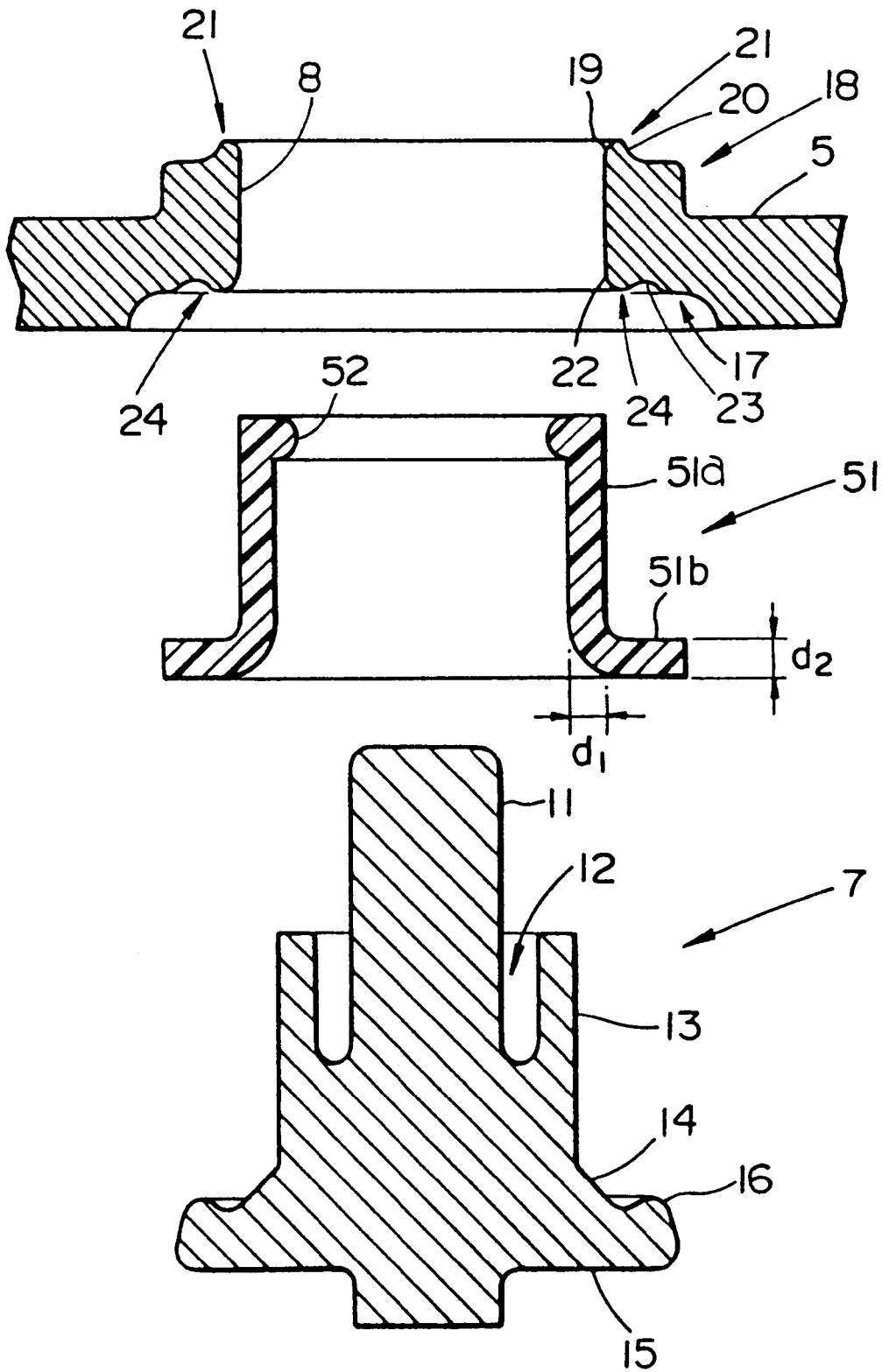
FIG. 9 is an enlarged cross-sectional view of an insulative sealing member for use in the electric double-layer capacitor housing.

As shown in FIG. 9, the insulative sealing member 51 is made of an elastomeric material such as fluoroplastics, rubber, or the like, and comprises a tubular member 51a fitted over the terminal body 10 and the outer sleeve 13 of the electrode terminal 7, and a flange skirt 51b extending radially outwardly from a lower end of the tubular member 51a. The tubular member 51a has a wall thickness $d_1$ which is greater than the wall thickness $d_2$ of the flange skirt 51b ($d_1 > d_2$). The insulative sealing member 51 also has an annular lip 52 projecting radially inwardly and extending along the upper end of an inner circumferential surface of the tubular member 51a.

Figure 10:
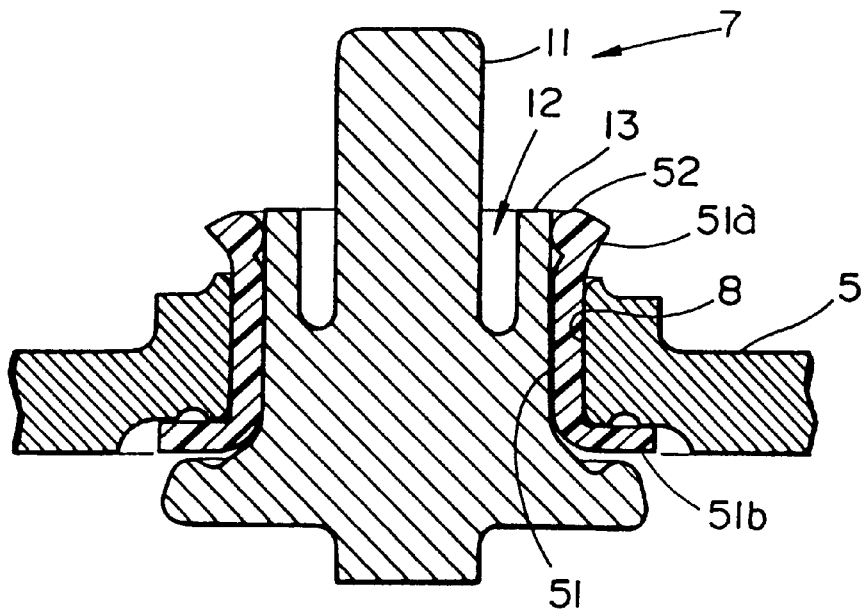
FIG. 10 is an enlarged cross-sectional view of the insulative sealing member shown in FIG. 10 as it is installed on an electrode terminal and a lid of the electric double-layer capacitor housing.

The tubular member 51a is inserted into the through hole 8 in the lid 5 and then the electrode terminal 7 is inserted into the tubular member 51a, whereupon the electrode terminal 7 and the lid 5 are assembled together with the tubular member 51a interposed between the terminal body 10 and the outer sleeve 13, and the inner circumferential surface of the through hole 8, as shown in FIG. 10. With the parts assembled as shown in FIG. 10, the annular lip 52 is held against the outer sleeve 13, spreading the upper end of the tubular member 51a radially outwardly. Therefore, the outer wall surface of the tubular member 51a which is made of the elastomeric material is pressed against the inner circumferential surface of the through hole 8. Since the upper end of the tubular member 51a is spread radially outwardly, the tubular member 51a is subject to forces tending to recover the original shape of the tubular member 51a. The annular lip 52 is pressed against the outer sleeve 13 under such recovering forces.

Therefore, the electrode terminal 7 and the lid 5 remain assembled together under pressing forces due to the elasticity of the insulative sealing member 51, so that the electrode terminal 7 is reliably prevented from being dislodged off the lid 5.

The electrode terminal 7 installed on the lid by the insulative sealing member 51 is then processed as shown in FIGS. 8 through 8. Specifically, the outer sleeve 13 is crimped into the bent flange 13a by which the upper end of the tubular member 51a is secured against the electrode terminal mount 18, as shown in FIG. 11.

Figure 11:
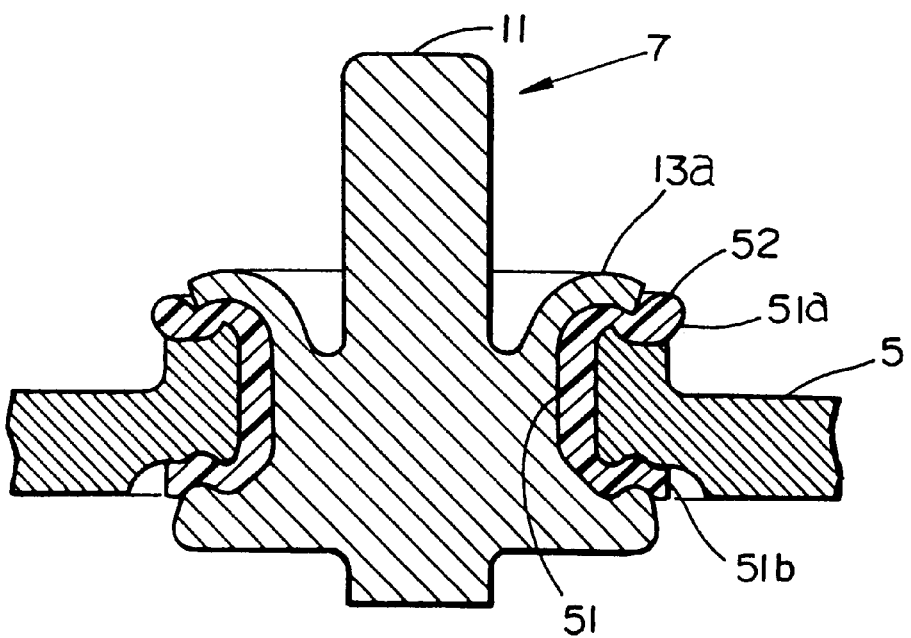
FIG. 11 is a view similar to FIG. 10, showing the manner in which a portion of the electrode terminal is crimped.
Figure 12:
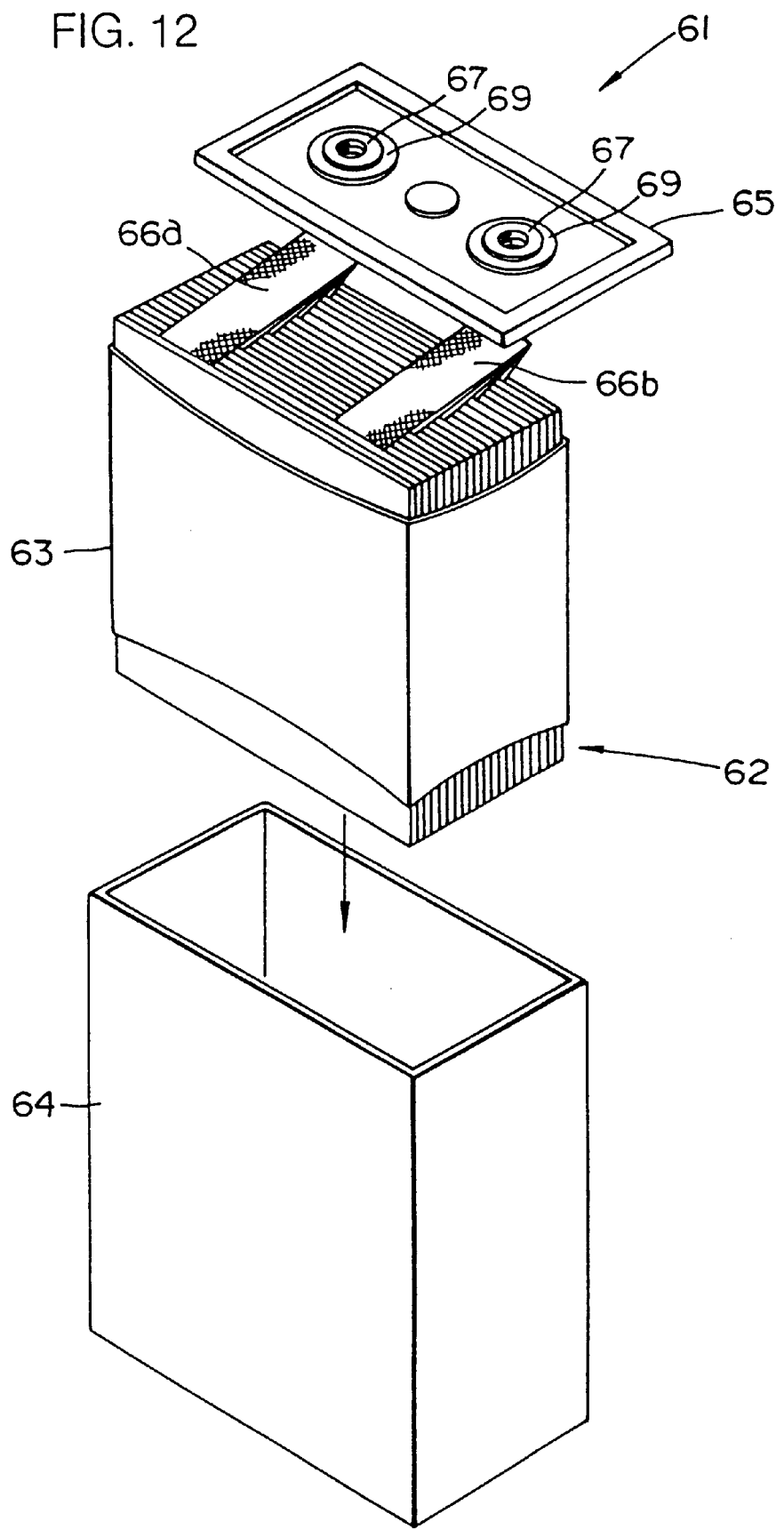
FIG. 12 is an exploded perspective view of a conventional electric double-layer capacitor housing.
Figure 13:
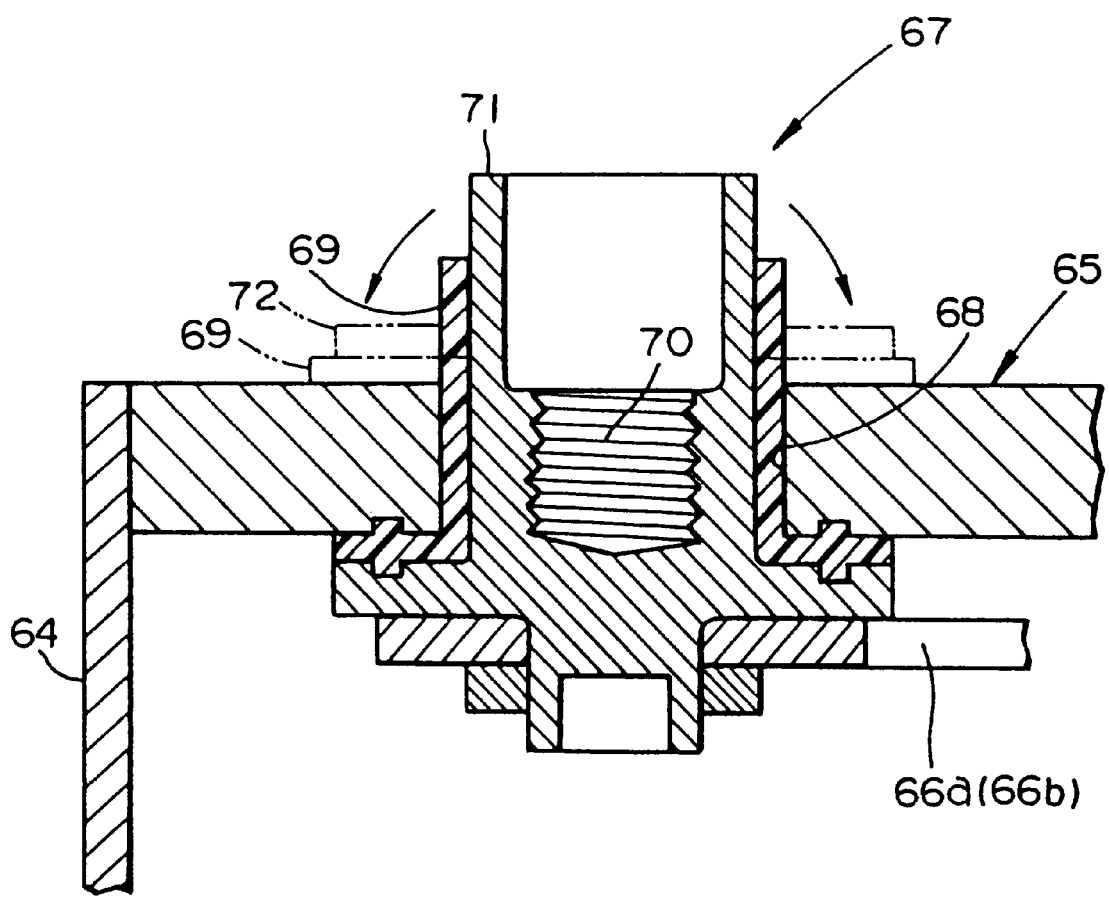
FIG. 13 is an enlarged fragmentary cross-sectional view of a portion of the conventional electric double-layer capacitor housing shown in FIG. 12.

The insulative sealing member 51 shown in FIG. 11 has an annular bead 52 on the upper end of the tubular member 51a, and the end of the bent flange 13a engages a boundary between the tubular member 51a and the annular bead 52. The annular bead 52 is thicker than the portion of the insulative sealing member 51 which is positioned below the end of the bent flange 13a. Because the insulative sealing member 51 is pressed by the end of the bent flange 13a, an inner portion of the insulative sealing member 51 which is positioned radially inwardly of the end of the bent flange 13a is subject to stresses tending to push the elastomeric material of the insulative sealing member 51 into the portion thereof which is sandwiched between the electrode terminal 7 and the lid 5. Thus, the elastomeric material of the insulative sealing member 51 is prevented from creeping, and the insulative sealing member 51 has an improved sealing capability.

The end of the bent flange 13a engages the boundary between the tubular member 51a and the annular bead 52. Therefore, the annular bead 52 suffers no stresses, and hence is prevented from cracking. Since the annular bead 52 is positioned radially outwardly of the end of the bent flange 13a, the bent flange 13a and the electrode terminal mount 18 are isolated from each other by the annular bead 52, and are securely insulated from each other.

Although certain preferred embodiments of the present invention have been shown and described in detail, it should be understood that various changes and modifications may be made therein without departing from the scope of the appended claims.

What is claimed is:

1. An electric double-layer capacitor housing comprising:

a bottomed outer case for accommodating an electric double-layer capacitor therein;

a lid closing an open end of said bottomed outer case, said lid having a through hole defined therein;

an electrode terminal mounted in said through hole in the lid for electrically connecting the electric double-layer capacitor in said bottomed outer case to an external circuit; and an insulative sealing member interposed between said lid and said electrode terminal and sealing said through hole;

said electrode terminal comprising a terminal body, a projecting rod extending upwardly from said terminal body coaxially therewith, an outer sleeve integral with said terminal body and spaced radially outwardly from said projecting rod, a tapered portion extending downwardly from said terminal body and spreading radially outwardly and downwardly, and a flange extending radially outwardly from said tapered portion and having an upward ridge on an edge thereof;

said insulative sealing member comprising a tubular member fitted over said terminal body and said outer sleeve of said electrode terminal, and a skirt extending radially outwardly from a lower end of said tubular member;

said lid comprising a circumferential surface defining said through hole through which said terminal body and said outer sleeve of said electrode terminal are inserted, a first convex surface contiguous to an upper end of said through hole and disposed on an upper surface of said lid, a first concave surface extending around said through hole, contiguous to said first convex surface, and disposed on the upper surface of said lid, a second convex surface contiguous to a lower end of said through hole and disposed on a lower surface of said lid, and a second concave surface extending around said through hole, contiguous to said second convex surface, disposed on the lower surface of said lid, and engaging the upward ridge of said flange of said electrode terminal;

the arrangement being such that said electrode terminal, with said tubular member of said insulative sealing member being fitted over said terminal body and said outer sleeve, is inserted into said through hole in said lid, and said outer sleeve is crimped radially outwardly into a bent flange, for thereby clamping a tip end of said tubular member between said bent flange, and said first convex surface and said first concave surface of said lid, and clamping said skirt between said flange and said tapered portion, and said second convex surface and said second concave surface of said lid.

2. An electric double-layer capacitor housing according to claim 1, wherein said projecting rod and said outer sleeve are spaced apart from each other by a gap having a bottom which is positioned downwardly of an upper end of said through hole when said bent flange is formed.

3. An electric double-layer capacitor housing according to claim 1, wherein said tapered portion has an upper end positioned upwardly of a lower end of said through hole when said bent flange is formed.

4. An electric double-layer capacitor housing according to claim 1, wherein said tubular member is thicker than said skirt.

5. An electric double-layer capacitor housing according to claim 1, wherein said electrode terminal has a connector mounted on said projecting rod outside of said bottomed outer case for electrical connection to the external circuit, said connector comprising a tubular member fitted over and fixed to said projecting rod and a shape keeper connected to an end of said tubular member closer to said bottomed outer case and positioned on said bent flange for keeping t he shape of said bent flange.

6. An electric double-layer capacitor housing according to claim 1, wherein said insulative sealing member has an annular lip projecting radially inwardly and extending along an inner circumferential surface of said tubular member fitted over said electrode terminal.

* * * * *